3,793,263
POLYMERIZATION CATALYST AND PROCESS USING A CHLORIDE TREATED SUPPORTED MOLYBDENUM OXIDE
Robert V. Morris, Naperville, Ill., assignor to Standard Oil Company, Chicago, Ill.
No Drawing. Filed Feb. 14, 1972, Ser. No. 226,269
Int. Cl. C08f 3/06, 15/04, 1/66
U.S. Cl. 260—88.2 R                    7 Claims

ABSTRACT OF THE DISCLOSURE

An improved composition of matter useful, when promoted by certain metals or their hydrides, for catalyzing the polymerization of ethylene and mixtures thereof with minor amounts of propylene to produce normally solid, crystalline polymers and copolymers which is made by a process comprising contacting a partially reduced, alumina-supported molybdenum (VI) compound with a chlorine-containing substance that is capable of removing a majority of the molybdenum, calculated as $MoO_3$.

SUMMARY OF THE INVENTION

This invention relates to an improved composition of matter useful for the polymerization of ethylene and mixtures thereof with minor amounts of propylene to produce normally solid, crystalline polymers and copolymers and more specifically to an improved material useful when promoted by certain metals or their hydrides for the polymerization of ethylene and mixtures thereof with minor amounts of propylene which is made by a process which comprises contacting a partially reduced, alumina-supported molybdenum (VI) compound with a chlorine-containing substance that is capable of removing a major portion of the molybdenum, calculated as $MoO_3$.

In accordance with the instant invention, ethylene is polymerized to normally solid polymers at atmospheric pressure and above and at moderate temperatures with a catalyst system which comprises: (a) a mixture of a smaller amount of molybdenum (VI) compound supported on a larger amount of high-surface-area-aluminum oxide; said mixture firstly having been partially reduced to produce lower-than-maximum oxidation states of molybdenum and, secondly, having been contacted by a chlorine-containing substance capable of removing a major portion of the molybdenum, and (b) a promoter.

The polymeric products produced using the above described catalyst have the following advantages over those produced by partially reduced, alumina-supported, molybdenum oxide chlorided by hydrogen chloride; they are formed in substantially improved yields based upon the weight of molybdenum, calculated as $MoO_3$, present on the alumina surface; as formed, they can have substantially smaller amounts of low-molecular-weight and amorphous components present than polymers produced by reduced and chlorided alumina-supported molybdenum oxide catalysts that were made using hydrogen chloride; they show little or no methyl or ethyl branching but substantially higher propyl group or greater branching; their melt indices, when compared with polymers produced at a given polymerization temperature, are markedly increased.

BACKGROUND OF THE INVENTION

Catalysts for olefin polymerization prepared using molybdenum (VI) compounds supported on alumina, and reduced, by for example, hydrogen and thereafter chlorided by, for example, hydrogen chloride, have several disadvantages including their moderate activity per weight of molybdenum, which necessitates a separation step to eliminate unwanted catalyst from the final polymeric product, and the necessity, when using the solution polymerization technique, of using a polymerization solvent of high boiling point when producing polymeric products having melt indices, i.e., molecular weights, in the commercially useful range.

Now it has been found that the polymerization temperature at which polyolefins of commercially useful molecular weight can be produced may be reduced while increasing the catalyst activity, based on the weight of molybdenum present, and, at the same time, produced polyolefins showing a substantially higher degree of alkyl group branching than has heretofore been obtained with the use of reduced, alumina-supported, molybdenum (VI) compound catalysts. This novel combination of features is obtained by the discovery that a major portion of the molybdenum can be removed as volatile molybdenum compounds by contacting a partially reduced, alumina-supported molybdenum (VI) compound with a chlorine-containing substance, for example, oxalyl chloride, at elevated temperatures. Treatment of the same material with hydrogen chloride, for example, is capable of removing only 10 to 20 percent of the molybdenum, calculated as $MoO_3$, during chloriding.

STATEMENT OF THE INVENTION

This novel contacting with a substance capable of removing a major portion of the molybdenum works only in conjunction with a molybdenum compound supported on alumina catalyst which prior to contacting has been partially reduced to provide a mixture comprising lower-than-maximum valence state molybdenum.

The surface area of the alumina used as a support is not critical but should be sufficiently large, about 150 square meters per gram or greater, to accommodate an appreciable amount of molybdenum compounds. The range of pore volumes and the range of crystalline forms of the high-surface-area alumina useful in this invention are well known to those skilled in the art of supported molybdenum compound catalysts. The preferred range of pore volumes is about 0.4 to about 1.5 cubic centimeters per gram. The preferred crystalline form of alumina is the gamma form.

The molybdenum may be placed upon the aluminum oxide support in a variety of different ways as is well known to those skilled in the art. For example, it may be deposited by evaporation or precipitation of a dissolved molybdenum salt. Normally, this deposition step is followed by treatment to convert the deposited molybdenum compound to molybdenum (VI) oxide.

The amount of molybdenum (VI) oxide on the surface of the alumina prior to the reduction and contacting is critical and depends upon the surface area of the alumina used. For an alumina of about 350 square meters per gram, a molybdenum concentration, calculated as $MoO_3$, of about 20 to about 21 weight percent before the aforementioned steps produces the highest yield of polymer. At this surface area, larger or smaller amounts of molybdenum (VI) oxide present on the surface before reduction and contacting results in decreased polymer yields, when calculated on the weight of molybdenum present on the catalyst.

The production of lower oxidation states of molybdenum on the alumina support is well known to those skilled in this art. For example, such reducing agents as hydrogen, carbon monoxide, sulfur dioxide and hydrocarbons, preferably hydrogen, have been used with success. With hydrogen a reduction temperature of about 450° C. is preferred for the partial reduction of the Mo (VI) compound.

In the preferred manner of forming the catalyst of the instant invention, a molybdenum (VI) compound is first deposited on the alumina surface, $MoO_3$ formed if necessary, and a portion of the molybdenum present is then reduced by hydrogen to a mixture of lower oxidation states of molybdenum. Then the chloride-containing substance is contacted with this reduced material at elevated temperature to accomplish simultaneously removal of a majority of the molybdenum and chloriding of the alumina-molybdenum-oxide mixture. However, the chloriding step and molybdenum removal operations may be accomplished in two steps; for examples, see Table II. When these two operations are accomplished in two steps the same or different chloriding and molybdenum-removal substances may be used. However, comparison of Tables I and II shows that at a given polymerization temperature a reduced, alumina-supported molybdenum oxide contacted first by hydrogen chloride and then by oxalyl chloride produces polymers having less alkyl group branching and smaller melt indices than polymers prepared from a material contacted by oxalyl chloride alone. This two step treatment also leads to less chloride in the catalyst, i.e., 4.10 versus 8.02 percent.

Another variant of the contacting procedure is to chloride at a lower temperature where the molybdenum compounds and alumina react with contacting substance and then to raise the temperature and remove the undesired molybdenum compounds from the surface using an inert gas sweep such as nitrogen or argon.

Removal of a large portion of the molybdenum from the catalyst is the critical step in the preparation of the new catalyst and for this purpose a number of different chlorine-containing substances may be used. Generally, a difficult-to-reduce, chlorine-containing substance is used which yields upon reaction at the surface, chloride ion bound to the catalyst surface and a difficult-to-reduce, small molecule. The preferred contacting substance is oxalyl chloride.

Treatment with the chlorine-containing substance is normally accomplished by contacting the partially reduced, alumina-supported molybdenum compound with the chlorine-containing substance present in the vapor phase. The length of this contacting step is controlled by noting the amount of molybdenum removed and contact times which allow removal of between about 40 to about 75 weight percent of the molybdenum present, calculated as $MoO_3$, are useful. More preferably, about 45 to about 70 weight percent of the molybdenum, calculated as $MoO_3$, is removed. Most preferably, about 50 to about 60 weight percent of the molybdenum, calculated as above, is removed.

The temperature of the contacting step depends upon the chlorine-containing substance used and the rate of removal of the volatile molybdenum compounds formed during contacting from the catalyst surface. A high enough temperature to remove efficiently the molybdenum is needed, but if the contacting temperature becomes too high, molybdenum removal may become uncontrolled and the contacting substance may pyrolyse decreasing its effectiveness by reducing its concentration.

When using oxalyl chloride the useful temperature range for the contacting step is about 200° C. to about 550° C. with a preferred temperature range from about 400° C. to about 500° C.

Some care should be used in handling the material as it is sensitive to air and/or moisture and its polymerization efficiency decreases with repeated handling. This effect may be noticed by comparing Run Nos. 3, 4 and 5 in Table I wherein Run No. 3 was the first run using the catalyst.

A substantially inert liquid reaction medium is desirably employed during the polymerization. This liquid is preferably a normally liquid saturated aliphatic or aromatic hydrocarbon but can be a relatively unreactive alkene (containing a non-terminal double bond) or in some instances, a cycloalkene, a perfluorocarbon, a chloroaromatic or mixtures of such suitable liquids. By "substantially inert liquid reaction medium," is meant liquids which remain liquid under polymerization conditions and which do not substantially interfere with the reaction or deleteriously affect the resultant polymer.

The temperature and pressure at which the olefin polymerization is carried out is not critical and are those usually provided when using supported molybdenum compound catalysts and thus are well known to those skilled in the art. In general, temperatures of about 180° C. to about 310° C., preferably about 200° C. to about 285° C., and pressures below about 500 atmospheres are useful.

The catalyst and process hereinafter described is most useful for ethylene but can be used to produce copolymers in which ethylene is copolymerized with up to about 10 weight percent, preferably up to about 5 weight percent, of propylene.

Chain terminating agents such as hydrogen may be used in conjunction with the catalyst of the instant invention to control the molecular weight distribution of the polymeric product as is well known to those skilled in this art.

The range of promoters which are useful in the instant invention are well known to those skilled in the art. Generally a Group I-A or Group II-A metal or metal hydride is used with the preferred promoter being sodium or sodium hydride.

A material which has been contacted by such a chlorine-containing substance and promoted as indicated shows increased activity measured on a per gram of molybdenum oxide present basis and in addition shows greater branching ($CH_3/C=C$ ratio) as shown in Table I. In addition, Table I shows that when hydrogen is used to reduce molecular weight (increase melt index), yields calculated on a per gram of $MoO_3$ basis increase even though the polymerization temperature has decreased substantially. Compare Run Nos. 4 and 6 in Table I.

While the invention is described in connection with the specific examples below, it is to be understood that these are for illustrative purposes only. Many alternatives, modifications and variations will be apparent to those skilled in the art in the light of the below examples and such alternatives, modifications and variations fall within the scope and spirit of the appended claims.

Example I

A seven gram portion of partially reduced, 21 weight percent molybdenum (VI) oxide supported on alumina (approximately 350 square meters per gram) was contacted with oxalyl chloride vapor at 450° C. for two hours using a 22 gram amount of oxalyl chloride to remove the undesired molybdenum compounds. The final molybdenum content of the catalyst was 8.50 weight percent, calculated as $MoO_3$, and the catalyst was found to contain 8.02 weight percent of chloride. The results for several ethylene polymerization runs using this novel catalyst are shown in Table I below, Run Nos. 3 through 7, and, in addition, Run Nos. 1 and 2 give results using the same hydrogen reduced, 20 weight percent molybdenum (VI) oxide supported on alumina catalyst, chlorided using the procedure of U.S. Pat. No. 3,352,795 which uses hydrogen chloride.

TABLE I.—ETHYLENE POLYMERIZATIONS WITH $MoO_3/Al_2O_3$ CATALYSTS

| | Chloriding reagent | Percent $MoO_3$ [1] | Percent Cl | Average Mo oxidation state | Grams sodium per gram of catalyst | Grams polymer per gram of catalyst per hour | Grams polymer per gram of $MoO_3$ per hour | Polymerization temperature, °C. | Melt index,[4] grams per 10 minutes | $CH_3/C=C$ [2] |
|---|---|---|---|---|---|---|---|---|---|---|
| 1 | Hydrogen chloride | 18.7 | 3.6 | 4.6 | 0.4 | 627 | 3,350 | 285 | 0.35 | 2.85 |
| 2 | do | 10.6 | 3.8 | 5.0 | 0.25 | 176 | 1,660 | 280 | 0.47 | 4.9 |
| 3 | Oxalyl chloride | 8.50 | 8.02 | 3.78 | 0.25 | 533 | 6,270 | 280 | 1.7 | 8.65 |
| 4 | do | 8.50 | 8.02 | 3.78 | 0.4 | 413 | 4,850 | 280 | 2.2 | 8.18 |
| 5 | do | 8.50 | 8.02 | 3.78 | 0.4 | 384 | 4,520 | 275 | 0.64 | 7.64 |
| 6 | do | 8.50 | 8.02 | 3.78 | 0.25 | 600 | 7,060 | 235 | 5.78 | |
| 7 | do [3] | 8.50 | 8.02 | 3.78 | 0.25 | 503 | 5,930 | 200 | 0.37 | |

[1] Total Mo present on the catalyst was calculated as if it were all in the form $MoO_3$.
[2] $CH_3/C=C$ ratio determined by infrared spectroscopy using ASTM D 2238-64T and the method of H. I. McMurray and U. Thornton, Anal. Chem., 24, 318 (1952).
[3] Runs made with about 2 mole percent hydrogen in the ethylene feed gas.
[4] ASTM D 1238.

Example II

A seven gram portion of partially reduced, 21 weight percent molybdenum (VI) oxide supported on alumina (approximately 350 square meters per gram) was chlorided with gaseous hydrogen chloride at elevated temperature using the procedure taught in U.S. Pat. No. 3,352,795. Additional molybdenum was removed by contacting with oxalyl chloride vapor at 450° C. for 45 minutes using about 3.9 grams of oxalyl chloride. The results of polymerization runs using ethylene and this catalyst are shown in Table II below:

TABLE II.—POLYMERIZATIONS WITH OXALYL CHLORIDE TREATED $MoO_3/Al_2O_3$ [1] [2]

| Run No. | Grams sodium per gram of catalyst used | Activity based on polymer | | Polymerization temperature, °C. | Melt index,[4] grams per 10 minutes | $CH_3/C=C$ [3] |
|---|---|---|---|---|---|---|
| | | Grams of polyethylene per gram of catalyst per hour | Grams of polyethylene per gram of $MoO_3$ per hour | | | |
| 1 | .05/.20 | 432 | 4,390 | 280 | .20 | 5.07 |
| 2 | .04/.10 | 510 | 5,180 | 280 | .28 | 6.22 |
| 3 | .10/.10 | 665 | 6,760 | 280 | .45 | 5.65 |
| 4 | .15/.10 | 580 | 5,900 | 280 | .47 | 5.09 |
| 5 | .20/.10 | 416 | 4,240 | 280 | | |

[1] Treatment: (1) HCl; (2) $(CO)_2Cl_2$.
[2] Initial $MoO_3$ concentration: approximately 21 percent. Final molybdenum concentration calculated as $MoO_3$, 9.83 percent. Chloride concentration: 4.10 percent.
[3] Determined using infrared spectroscopy using ASTM D 2238-64T and the method of H. I. McMurray and U. Thornton, Anal. Chem., 24 318 (1952).
[4] ASTM D 1238.

Example III

Four seven gram samples of partially reduced, 21 weight percent commercially available molybdenum (VI) oxide supported on alumina (approximately 350 square meters per grams) were contacted at 450° C. as below:

| Sample | Weight oxalyl chloride used (grams) | Contacting time (minutes) | Weight percent | |
|---|---|---|---|---|
| | | | Mo as $MoO_3$ [1] | Cl [1] |
| A | 1.3 | 15 | 20.7 | 4.2 |
| B | 3.2 | 30 | 16.3 | 6.3 |
| C | 4.6 | 60 | 10.4 | 9.0 |
| D | 10.3 | 120 | 7.9 | 8.7 |

[1] After contacting with oxalyl chloride.

The results of using the above samples for polymerization runs using ethylene are shown in Table III below:

TABLE III.—ETHYLENE POLYMERIZATIONS WITH OXALYL CHLORIDE ACTIVATED CATALYSTS [1]

| Run number | Catalyst sample | Polymerization temperature, °C. | Melt index,[3] grams/10 minutes | n-Hexane extractables,[2] weight percent | $CH_3/C=C$ [3] |
|---|---|---|---|---|---|
| 1 | A | 287 | 3.37 | .68 | 4.03 |
| 2 | A | 280 | .31 | .50 | 3.49 |
| 3 | A | 276 | .15 | .33 | 3.71 |
| 4 | A | 296 | 5.7 | .87 | 4.06 |
| 5 | B | 280 | .58 | .55 | 3.71 |
| 6 | B | 288 | 3.53 | .49 | 4.08 |
| 7 | B | 302 | 7.5 | 1.38 | 4.01 |
| 8 | B | 277 | .57 | .55 | 3.35 |
| 9 | B | 295 | 5.4 | .76 | 4.09 |
| 10 | C | 296 | 5.6 | .88 | 5.39 |
| 11 | C | 288 | 4.1 | .79 | 5.60 |
| 12 | C | 278 | .51 | .51 | 4.84 |
| 13 | C | 280 | 1.2 | .60 | 4.40 |
| 14 | D | 277 | 1.0 | .42 | 7.47 |
| 15 | D | 280 | 1.1 | .66 | 8.24 |
| 16 | D | 288 | 7.0 | .44 | 8.31 |
| 17 | D | 296 | 11.0 | 1.22 | 5.06 |
| 18 | D | 272 | .24 | .10 | 5.59 |

[1] Sodium metal used as a promoter.
[2] Soxhlet type of extraction.
[3] Methods used are as previously described in Table II.

Example IV

A comparison of the weight percent hexane extractables for a given melt index is made for polyethylenes made using Catalyst Sample D in Table III and polyethylenes formed under similar conditions from 20 weight percent $MoO_3$ on 350 square meters per gram of alumina reduced with hydrogen catalysts made using hydrogen chloride as a chloriding agent. The results are shown in Table IV below:

TABLE IV [1]

| Melt index, grams/10 minutes | Oxalyl chloride contacted $MoO_3/Al_2O_3$ catalyst: Catalyst No. D of Table III (weight percent extractables) | Hydrogen chloride treated $MoO_3/Al_2O_3$ catalyst (weight percent extractables) |
|---|---|---|
| 0.24 | 0.10 | 0.5 |
| 1.0 | 0.42 | 1.0 |
| 1.1 | 0.6 | 1.05 |
| 7.0 | 0.44 | 2.6 |
| 11.0 | 1.22 | 3.1 |

[1] Weight percent extractables are weight percents calculated by measuring the total weight of polymer extracted using a 6-hour n-Hexane extraction in a Soxhlet extractor and correcting for residual solvent removable on 16 hours vacuum at 140° C.

What is claimed is:

1. In the process of preparing a material useful for the polymerization of ethylene or a mixture thereof with minor amounts of propylene, said process comprising reducing and chloriding a composition containing a minor amount of molybdenum oxide supported on a major amount of high-surface-area alumina, the improvement which consists of chloriding with oxalyl chloride in a temperature range between about 200° C. and about 500° C. simultaneously removing about 40 to about 75 weight percent of the molybdenum, calculated as $MoO_3$.

2. The improved process of claim 1 wherein said alumina is in the gamma crystalline form and has a surface area of about 350 square meters per gram.

3. The improved process of claim 2 wherein about 50 to about 60 weight percent of molybdenum, calculated as $MoO_3$, is removed.

4. A process for the polymerization of ethylene or a mixture thereof with minor amounts of propylene which comprises contacting under polymerizing conditions said ethylene or said mixtures with a combination of:
 (a) a material produced by a step of
  (i) reducing a composition containing a minor amount of molybdenum oxide supported on a major amount of high-surface-area alumina and a step of
  (ii) chloriding the substance resulting from step (a)(i) with oxalyl chloride in a temperature range between about 200° C. and about 500° C. simultaneously removing about 40 to about 75 weight percent of the molybdenum, calculated as $MoO_3$, and
 (b) a member of the group consisting of sodium, lithium, calcium or the hydrides thereof.

5. The process of claim 4 wherein the material of (b) is either sodium or sodium hydride.

6. The process of claim 5 wherein said alumina is in the gamma crystalline form and has a surface area of about 350 square meters per gram.

7. The process of claim 6 wherein 50 to about 60 percent of molybdenum, calculated as $MoO_3$, is removed.

References Cited

UNITED STATES PATENTS

| | | | |
|---|---|---|---|
| 3,530,077 | 9/1970 | Shepard | 252—442 |
| 3,544,534 | 12/1970 | Kadowski | 260—88.2 |
| 3,634,539 | 1/1972 | Alkema | 260—683 D |

JOSEPH L. SCHOFER, Primary Examiner

A. HOLLER, Assistant Examiner

U.S. Cl. X.R.

252—441, 467; 260—94.9 D

UNITED STATES PATENT OFFICE
CERTIFICATE OF CORRECTION

PO-1050
(5/69)

Patent No. 3,793,263     Dated February 19, 1974

Inventor(s) Robert V. Morris

It is certified that error appears in the above-identified patent and that said Letters Patent are hereby corrected as shown below:

Column 5-6 - Table I - Under heading Chloriding Reagent - Opposite No. 6 - the do should be changed to do$^3$.

Column 5-6 - Table 1 - No. 1 footnote

1 Total Mo present on the catalyst was calculated as if it were all in the form MoO$_3$.

should be moved down to where Nos. 2, 3, and 4 footnotes are located.

Signed and sealed this 2nd day of July 1974.

(SEAL)
Attest:

EDWARD M. FLETCHER, JR.
Attesting Officer

C. MARSHALL DANN
Commissioner of Patents